United States Patent [19]
Bressler

[11] Patent Number: 5,627,733
[45] Date of Patent: May 6, 1997

[54] POWER SUPPLY DEVICE

[75] Inventor: Johann Bressler, Nürnberg, Germany

[73] Assignee: U.S. Philips Corporation, New York, N.Y.

[21] Appl. No.: 540,519

[22] Filed: Oct. 10, 1995

[30] Foreign Application Priority Data

Oct. 13, 1994 [DE] Germany .......................... 44 36 553.5

[51] Int. Cl.⁶ ............................................... H02M 3/335
[52] U.S. Cl. .................... 363/21; 363/41; 363/97
[58] Field of Search ................................ 363/16, 20, 21, 363/41, 97

[56] References Cited

U.S. PATENT DOCUMENTS

| 4,357,654 | 11/1982 | Ikenoue et al. | 363/21 |
| 4,559,592 | 12/1985 | Muller | 363/21 |
| 4,928,220 | 5/1990 | White | 363/21 X |
| 5,469,349 | 11/1995 | Marinus | 363/21 |

FOREIGN PATENT DOCUMENTS

| 61-293165 | 12/1986 | Japan . |
| 63-305755 | 12/1988 | Japan . |

Primary Examiner—Peter S. Wong
Assistant Examiner—Y. J. Han
Attorney, Agent, or Firm—Leroy Eason

[57] ABSTRACT

A power supply device includes a series arrangement of an inductance (3), a switching device (4) clocked by a control circuit (12), and a current measuring impedance (5), which series arrangement is arranged between two terminals (1, 2) to which a supply voltage (Ue) can be applied. A voltage (Um) appearing across the current measuring impedance (5) is applied via an input resistor 17to an input (18) of the control circuit (12) to control the switching device (4), a capacitance (19) being in parallel with the input (18) of the control circuit (12).

A diode (20) is arranged in parallel with the input resistor (17), dimensioned in such a manner relative to one another that the diode (20) becomes conductive only when the Voltage (Um) across the current measuring impedance (5) exceeds a given limit value. Also, the ohmic resistance of the diode (20) together with the capacitance (19) forms a smaller time constant than the input resistor (17) with the capacitance (19). It is thereby achieved that despite a high attenuation for interference voltages short conduction times for the switching device (4) and, consequently, a small thermal load in the case of overloading are attainable.

4 Claims, 1 Drawing Sheet

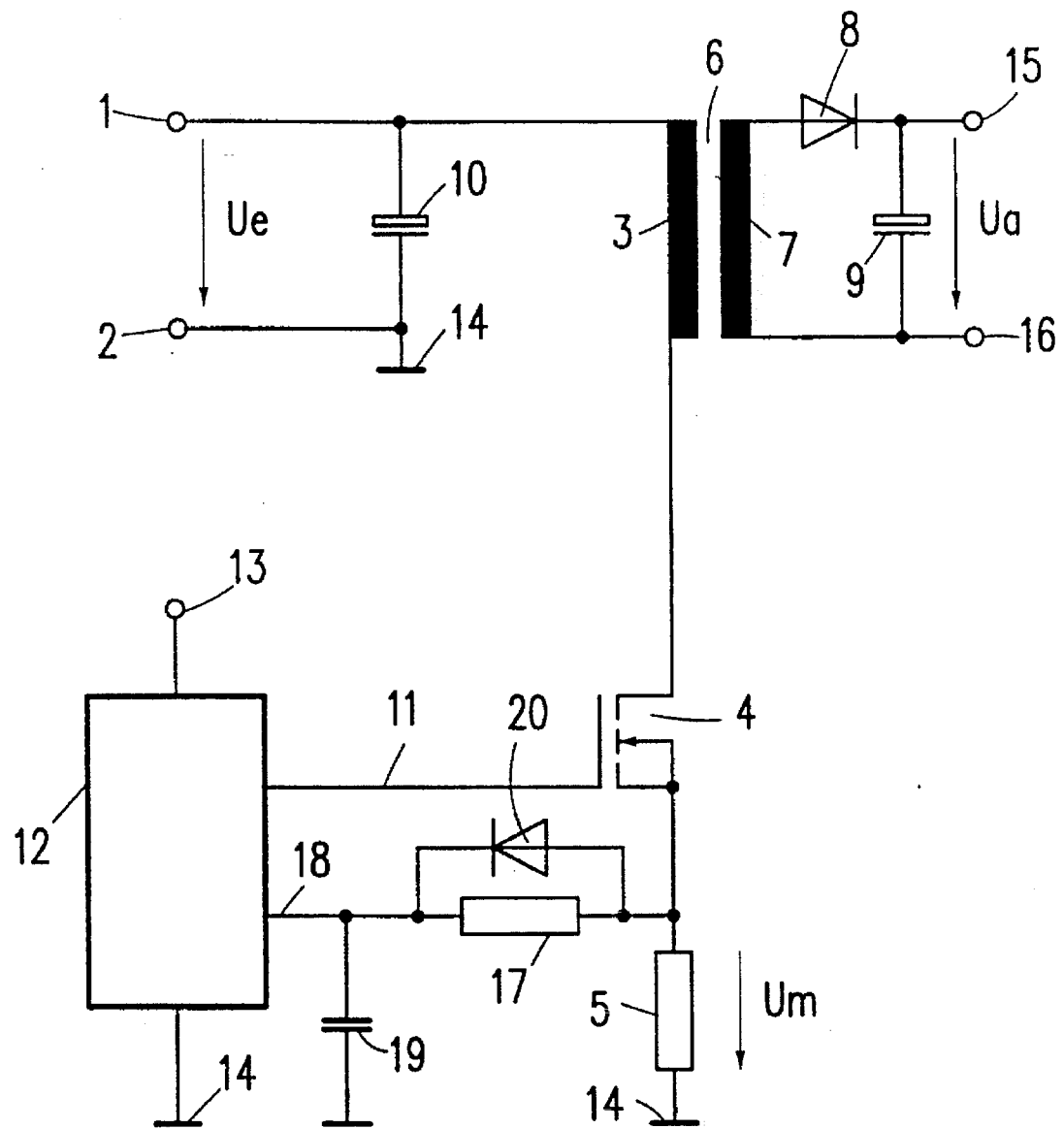

POWER SUPPLY DEVICE

BACKGROUND OF THE INVENTION

1. Field of the Invention

The invention relates to a power supply device comprising a series arrangement of an inductance, a switching device clocked by a control circuit, and a current measuring impedance, which series arrangement is arranged between two terminals to which a supply voltage can be applied, an input resistor via which a voltage appearing across the current measuring impedance can be applied to an input of the control circuit to control the switching device, and a capacitance in parallel with the input of the control circuit.

2. Description of the Related Art

From the English-language abstract of the Japanese document 63-305755(A) of 13.12.1988 a control circuit for a switched-mode power supply is known, which comprises a driver circuit for a pulse-width control signal from the control circuit, a transformer, a power MOSFET and a control signal generation circuit which generates a control signal. The control circuit comprises a comparator, a quasi-trapezoidal wave generator and a reference source. The quasi-trapezoidal wave generator receives a reference voltage and generates a quasi-trapezoidal signal, which is used as a reference signal. The circuit arrangement shown has a resistor arranged between the power MOSFET and ground. A diode, whose cathode is grounded via a capacitor, has its anode connected to the node between the power MOSFET and the resistor. Moreover, the cathode of the diode is connected to ground via a further resistor and is connected directly to an input of the comparator. The resistor, the capacitor and the diode constitute a control signal generation circuit which derives a direct voltage from the voltage produced across the first-mentioned resistor by the current through the power MOSFET, which direct voltage is applied to the comparator as a control signal. In addition, the quasi-trapezoidal wave generator applies a trapezoidal signal to the comparator. The comparator supplies a pulse-width control signal. Accordingly, the pulse width of the pulse-width control signal decreases drastically if the control signal from the control circuit for the switched-mode power supply exceeds the peak level of the quasi-trapezoidal wave. This is in order to achieve a suitable slope of the output current characteristic.

The English-language abstract of the Japanese document 61-293165 (A) of 23.12.1986 discloses an overcurrent protection circuit for a switching regulator. This circuit includes a smoothing capacitor connected to an alternating voltage source. The output signal of this smoothing capacitor is applied to the series arrangement of the primary winding of a transformer and a switching transistor, as a result of which the desired output signal is available across the secondary winding of the transformer. A current detection resistor is arranged in series with the transistor. The detected output signal of the current detection resistor is applied to a further transistor for overcurrent protection. This signal is applied via a network comprising a series arrangement of an inductance and a resistor and, in parallel with the input of the further transistor the parallel arrangement of a further resistor and a capacitance. This circuit arrangement, particularly said series inductance, serves to reduce high-frequency interference in the detected current from the current detection resistor so as to preclude incorrect operation.

Thus, in the known circuit arrangements interference from the current measuring impedance reaches the control circuit via networks which either transmit only direct voltages or low-frequency voltage components but which attenuate or suppress high-frequency components. As a result, it is also possible to attenuate very brief parasitic voltage transients. However, in the event of a short-circuit at the output of the power supply device, i.e. particularly in the case of a short-circuit of the secondary winding, the high attenuation causes the maximum output current to become substantially larger than in the case of dimensioning for a low attenuation, because the time during which the switching transistor is in its on-state is increased with increasing attenuation. As a result, the switching transistor as well as the other power devices, such as for example the transformer and the circuit elements connected to the secondary winding of this transformer are subjected to a substantial thermal load. A current limiter connected, for example, to the secondary winding of the transformer could then be a remedy but would require an undesirably large number of component parts. This number increases as the voltage to be supplied by the power supply device is selected higher.

SUMMARY OF THE INVENTION

It is an object of the invention to construct a power supply device of the type defined in the opening paragraph in such a manner that despite a high attenuation for interference voltages short on-times for the switching transistor and, consequently, a small thermal load in the case overloading are achieved.

According to the invention this object is achieved in a power supply device of the type defined in the opening paragraph, in that a diode is arranged in parallel with the input resistor and in that the diode and the input resistor are dimensioned in such a manner relative to one another that the diode becomes conductive only when the voltage across the current measuring impedance exceeds a given limit value, and in that the ohmic resistance of the diode together with the capacitance forms a smaller time constant than the input resistor with the capacitance.

By means of very simple circuit-design measures the invention ensures that in normal operation of the power supply device, i.e. when the voltage across the current measuring impedance does not yet exceed the limit value and the current in the clocked switching device is consequently still smaller than a corresponding limit value, the input resistor with the capacitance constitute a constant which is large enough for effectively attenuating high-frequency interference, particularly parasitic voltage transients as a result of switching processes or the like. Particularly said parasitic voltage transients, which in the case of small currents through the inductance and the switching device, i.e. in the case of a small load of the power supply device near no-load operation, are preferably large in relation to the total current through the inductance and the switching device, are suppressed effectively in this operating condition and can no longer lead to instability of the power supply device.

In the case of larger currents through the inductance and the switching device and, consequently, also through the current measuring impedance, a higher voltage will appear across the latter. As a result of this, the diode in parallel with the input resistor becomes conductive. The ohmic resistance of the diode in the conductive state, however, is substantially smaller than the input resistance, which in conjunction with the capacitance results in a smaller time constant. In this operating condition this will also reduce the attenuation of parasitic voltage transients but this is not important. On the other hand, the small time constant of the combination of the conductive diode and the capacitance provides a substantial reduction of the delay in the drive of the control circuit by the voltage across the current measuring impedance, thereby enabling the time interval between the turn-on of the switching device and its subsequent turn-off to be reduced significantly. For example, also in the operating condition described above the control circuit can periodically turn on the clocked switching device with the clock frequency intended for normal operation, and since the voltage across the current measuring impedance is fed back to the control circuit with a very small delay via the diode and the capacitance, the switching device is then turned off very rapidly by the control circuit, until it is turned on again at the beginning of the next clock period. In this way it possible without any further steps to achieve a satisfactory overload protection of the power supply device with a very economical dimensioning of the component parts, particularly the inductance, of the switching device and the current measuring impedance.

In an embodiment of the power supply device in accordance with the invention the inductance is formed by the primary winding of a transformer whose secondary winding is arranged to be connected to a load. It is then advantageous if the given limit value of the voltage across the current measuring impedance corresponds to a nominal operating condition of the power supply device, in which the secondary winding is connected to a nominal load. When the power supply device is loaded with an electric power up to the power corresponding to the nominal load, the diode is cut off and a comparatively large time constant formed by input resistance and the capacitance is active for the control circuit in the power supply device. If the power consumed by the load or the power to be supplied by the power supply device exceeds the value corresponding to the nominal load, as is preferably the case in the event of a short-circuit of the secondary winding, the diode is turned on and the control circuit is controlled with the smaller time constant dictated by the ohmic resistance of the diode and the capacitance. If the power supply device is constructed with a secondary winding of the kind described and, if applicable, a rectifier and smoothing device (for example, diode, capacitor) connected to this winding, the reduced complexity of the circuit in order to obtain a smaller thermal load also applies to this secondary winding and the elements connected to this winding.

DESCRIPTION OF THE PREFERRED EMBODIMENTS

An embodiment of the invention will now be described in more detail with reference to the sole drawing. The power supply device shown therein, of which only the elements which are relevant to the present invention are shown diagrammatically, comprises two terminals 1 and 2 of a series arrangement of an inductance 3, a switching device 4 and a current measuring impedance 5, to which terminals a supply voltage can be applied. In the present example the switching device 4 is formed by a field effect transistor and the current measuring impedance 4 is formed by an ohmic resistance, but different forms are also possible. A non-purely ohmic current measuring impedance, for example, may provide relationship which differs from a simple linear relationship between the current through the inductance 3 and the switching device 4 and the voltage appearing across the current measuring impedance 5, depending on whether and to what extent this is required.

In the present example the inductance 3 is formed by the primary winding of a transformer 6, which has its secondary winding 7 connected to a series arrangement of a rectifier 8 and a smoothing capacitor 9. A further smoothing capacitor 10 is arranged between the two terminals 1 and 2 and serves to smooth the supply voltage applied via these terminals 1 and 2 and to store the energy applied by means of this supply voltage. In the present example the second terminal 2 and the current measuring impedance are, moreover, grounded.

During operation of the present power supply device the switching device 4 is alternately turned on and turned off with a high-frequency control signal by a control circuit 12 connected to its control terminal 11. In the present example the control terminal 11 is formed by a gate terminal of the field effect transistor forming the switching device 4. The control circuit 12 has a supply voltage terminal 13, via which it is supplied with electric power from a device, not shown. The control circuit 12 is also connected to ground 14.

In operation of the present power supply device the supply voltage Ue is applied to its terminals 1, 2. Since the switching device 4 is alternately turned on and turned off current pulses are generated in the inductance 3, which pulses are transferred to the secondary winding 7 of the transformer 6 and are rectified by the rectifier 8. As a result, an output voltage Ua appears across the smoothing capacitor 9 and can be applied to a load connected to the terminals 15, 16 of a smoothing capacitor 9. The current pulses, which also flow into the current measuring impedance 5, across which they produce a voltage Um whose instantaneous value is proportional to the current.

The node between the switching device 4 and the current measuring impedance 5 is connected to an input 18 of the control circuit 12 via an input resistor 17. Thus, the voltage Um produced across the current measuring impedance 5 is applied to the control circuit 12 via the input resistor 17. If the instantaneous value of the voltage at the input 18 and, consequently, the instantaneous value of the voltage Um exceeds a given limit value, the control circuit turns off the switching device 4 via the control terminal 11 and thus interrupts the current through the inductance 3. This process is repeated in each switching cycle of the switching device 4. If the voltage at the input 18, which corresponds to the voltage Um across the current measuring impedance 5, exceeds the given limit value, the control circuit 12 will immediately turn off the switching device 4 for the current switching cycle via the control terminal 11. This process is repeated in each switching cycle. In the case of overloading, i.e. when the voltage Um exceeds the given limit value, the switching device 4 is therefore turned on for very short time intervals. Thus, the elements of the present power supply device, particularly the transformer 6, the switching device 4, the current measuring impedance 5 and the rectifier 8 are protected against thermal overloading.

In addition, a capacitance 19 is arranged between the input 18 of the control circuit 12 and ground 14, which capacitance in conjunction with the input resistor 17 forms an RC low-pass filter which has a given time constant and which serves to suppress high-frequency interference and voltage transients in the voltage Um which could otherwise lead to an incorrect operation of the control circuit 12 via the input 18. This could lead to instabilities in the operation of the power supply device. However, as a result of this RC low-pass filter comprising the input resistor 17 and the capacitance 19 the voltage at the input 18 will not immediately follow the voltage Um but appears with a small delay relative thereto and with "smoother" transitions. As a result, the control circuit 12 will also turn on the switching device 4 with a delay via the control terminal 11 when the voltage Um exceeds the given limit value. Thus, in the case of overloading—in the borderline case of a short-circuit—a larger current will flow through the inductance 3, the switching device 4 and the current measuring impedance 5, which current gives rise to a higher thermal load of these parts. Since the current is also transformed to the secondary winding 7 of the transformer 6 this secondary winding 7 as well as the rectifier 8 and, if present, the smoothing capacitor 9 and a load, not shown, which is connected to this capacitor will be subjected to a substantial thermal load.

In order to avoid this load, which necessitates a higher rating of said elements and may even lead to the destruction of these elements, the present embodiment of the power supply device in accordance with the invention comprises a diode 20 arranged in parallel with the input resistor 17, which diode has its anode connected to the current measuring impedance 5 and its anode to the input 18. The diode 20 and the input resistor 17 are dimensioned in such a manner that for voltages Um below said limit value or just corresponding to this value, i.e. for loads of the power supply device up to its nominal load, the diode 20 remains cut off and therefore has no effect. The diode 20 is not turned on until the instantaneous value of the voltage Um exceeds said limit value. In this turned-on state its ohmic resistance is substantially smaller than the ohmic resistance of the input resistor 17. Thus, in the case of overloading an RC low-pass filter comprising the ohmic resistance of the parallel arrangement of the diode 20 and the input resistor 17 and the capacitance 19 becomes active between the current measuring impedance 5 and the input 18 of the control circuit 12, which filter has a time constant which is smaller, preferably substantially smaller, than the time constant of the combination of the input resistor 17 alone and the capacitance 19. This results in an appreciable reduction of the switching delay for the switching device 4, which leads to a substantial reduction of the time intervals in which a large current flows in the case of overloading. The transformer 6, the switching device 4, the current measuring impedance 5, the rectifier 8 and any further elements connected thereto can then be dimensioned so as to be substantially cheaper.

This circuit arrangement combines the advantages of noise immunity at a small load of the power supply device with the advantage of an effective overload and short-circuit protection in a constructionally very simple manner. Moreover, even in the case of very small currents through the inductance 3, with a very small load of the power supply device, it is possible to effectively suppress parasitic voltage transients, which are then particularly dominant in relation to the total current through the inductance 3 and, on the other hand, the switching speed at high loads is not limited, but in the case of overloading the switching device 4 receives only very short current surges in each switching cycle in the case of overloading and is thus loaded to a small degree only.

A preferred field of use of the power supply device in accordance with the invention is its use in pulse-width modulating control circuits.

I claim:

1. A power supply device comprising a series arrangement of an inductance (3), a switching device (4) clocked by a control circuit (12), and a current measuring impedance (5), which series arrangement is arranged between two terminals (1, 2) to which a supply voltage (Ue) can be applied, an input resistor (17) via which a voltage (Um) appearing across the current measuring impedance (5) can be applied to an input (18) of the control circuit (12) to control the switching device (4), and a capacitance (19) in parallel with the input (18) of the control circuit (12), characterised in that a diode (20) is arranged in parallel with the input resistor (17) and in that the diode (20) and the input resistor (17) are dimensioned in such a manner relative to one another that the diode (20) becomes conductive only when the voltage (Um) across the current measuring impedance (5) exceeds a given limit value, and in that the ohmic resistance of the diode (20) together with the capacitance (19) forms a smaller time constant than the input resistor (17) with the capacitance (19).

2. A power supply device as claimed in claim 1, characterized in that the inductance (3) is formed by the primary winding of a transformer (6) whose secondary winding (7) is arranged to be connected to a load.

3. A power supply device as claimed in claim 2, characterised in that the given limit value of the voltage (Um) across the current measuring impedance (5) corresponds to a nominal operating condition of the power supply device, in which the secondary winding (7) is connected to a nominal load.

4. A power supply device as claimed in claim 2, characterised in that the diode (20) can be driven into conduction when the secondary winding (7) is short-circuited.

* * * * *